UNITED STATES PATENT OFFICE.

RICHARD MÜLLER, OF EILENBURG, GERMANY.

MANUFACTURE OF ORGANIC ACID ANHYDRIDS OR OF MIXTURES OF SUCH ANHYDRIDS WITH THEIR ACIDS.

1,153,402. Specification of Letters Patent. Patented Sept. 14, 1915.

No Drawing. Application filed March 4, 1914. Serial No. 822,450.

*To all whom it may concern:*

Be it known that I, Dr. RICHARD MÜLLER, chemist, a subject of the German Emperor, residing at Eilenburg, Germany, have invented certain new and useful Improvements in the Manufacture of Organic Acid Anhydrids or of Mixtures of Such Anhydrids with Their Acids, of which the following is a specification.

My invention relates to a process for the manufacture of organic acid anhydrids or of mixtures of such anhydrids with their acids.

It has been found that acetic anhydrid can be obtained in almost the full theoretical quantity from dry acetates, such as acetate of sodium or calcium, by passing over the said acetates vapor of nitric anhydrid, obtained for instance from phosphorus pentoxid and nitric acid, or by passing over the acetates mixtures of nitrogen oxids with air or oxygen. The oxids of nitrogen were obtained for instance by heating fuming nitric acid, or by decomposing sodium nitrite with an acid such as acetic or sulfuric acid, or by decomposing dilute nitric acid by metals such as copper or lead, or by calcining nitrates such as nitrate of lead, nitrate of barium, etc. In each of these cases, the vapors are completely absorbed by the acetate under the developing of heat, acetic anhydrid or, when the gases or the acetate are not completely dry, mixtures of acetic anhydrid with acetic acid, being formed, while the acetate is quantitatively converted into nitrate.

From the mixture of nitrate, with acetic anhydrid, or anhydrid and acetic acid, thus obtained, the latter substance or substances can be obtained in almost the full theoretical quantity by heating in a vacuum or by extraction. The resulting acetic anhydrid, or the mixture thereof with acetic acid, contains only traces of nitrogen oxids of which it can be freed by distillation over acetates.

Mixtures of acetates, butyrates, propionates, such for instance as are found in gray lime, give mixed anhydrids of these acids. The reaction can be carried out by passing oxids of nitrogen, together with air or oxygen or nitric anhydrid alone, over solutions or suspensions of dry salts of the corresponding organic acids in liquids which do not enter into the reaction.

The method described enables anhydrids to be manufactured very cheaply from salts of organic acids, more particularly by using gaseous oxids of nitrogen obtained in any well known manner.

What I claim is:

1. The method of making organic anhydrids, which consists in reacting upon salts of the corresponding organic acids with an oxid of nitrogen.

2. The method of making organic anhydrids, which consists in reacting upon the dry salts of the corresponding organic acids with an oxid of nitrogen.

3. The method of making acetic anhydrids, which consists in subjecting an acetate to the action of nitric anhydrid.

4. The method of making acetic anhydrids, which consists in subjecting a dry acetate to the action of nitric anhydrid.

In testimony whereof I have hereunto set my hand in presence of two subscribing witnesses.

DR. RICHARD MÜLLER.

Witnesses:
RUDOLPH TRIEKE,
EBEN BRIER.